(12) United States Patent
Minnick

(10) Patent No.: US 7,270,144 B2
(45) Date of Patent: Sep. 18, 2007

(54) UNIVERSAL WASHING MACHINE OUTLET BOX

(75) Inventor: Michael W. Minnick, Westlake, OH (US)

(73) Assignee: Oatey Co., Cleveland, OH (US)

( * ) Notice: Subject to any disclaimer, the term of this patent is extended or adjusted under 35 U.S.C. 154(b) by 555 days.

(21) Appl. No.: 10/768,544

(22) Filed: Jan. 30, 2004

(65) Prior Publication Data

US 2005/0166965 A1 Aug. 4, 2005

(51) Int. Cl.
*F16L 3/00* (2006.01)
(52) U.S. Cl. ...................................... 137/360
(58) Field of Classification Search ................ 137/360; 312/229
See application file for complete search history.

(56) References Cited

U.S. PATENT DOCUMENTS

| | | | |
|---|---|---|---|
| 3,834,781 A * | 9/1974 | Logsdon | 312/229 |
| 3,847,175 A | 11/1974 | Anderson | |
| 4,158,471 A * | 6/1979 | Logsdon | 312/229 |
| 4,410,004 A | 10/1983 | Kifer et al. | |
| 4,564,249 A | 1/1986 | Logsdon | |
| 4,716,925 A | 1/1988 | Prather | |
| 4,865,072 A | 9/1989 | Logsdon | |
| 4,934,410 A | 6/1990 | Humber | |
| 6,125,881 A | 10/2000 | Hobbs et al. | |
| 6,148,850 A | 11/2000 | Kopp et al. | |
| 6,155,286 A | 12/2000 | Geary | |
| 6,484,331 B2 | 11/2002 | Minnick | |

* cited by examiner

*Primary Examiner*—Eric Keasel
*Assistant Examiner*—Cloud Lee
(74) *Attorney, Agent, or Firm*—Renner, Otto, Boisselle & Sklar, LLP

(57) ABSTRACT

A washing machine outlet box includes a housing having a bottom wall containing multiple openings and two valve mount inserts insertable into selective openings for supporting water shut off valves therein. The two valve mount inserts may be individual valve mount inserts that are separately insertable into two of the openings or the two valve mount inserts may be joined together for insertion into at least one of the openings as a unit. A drain pipe may be connected to another opening in which the two valve mount inserts are not inserted. A twist on and twist off test cap may be used to seal off the drain pipe opening during pressure testing of a sanitary drainage system to which the drain pipe is connected.

32 Claims, 6 Drawing Sheets

UNIVERSAL WASHING MACHINE OUTLET BOX

FIELD OF THE INVENTION

The present invention relates to a universal washing machine outlet box that may accommodate a center drain arrangement, a right hand drain arrangement or a left hand drain arrangement.

BACKGROUND OF THE INVENTION

Washing machine outlet boxes are commonly used in new housing construction or remodeling to provide the plumbing connections necessary for a washing machine. A washing machine outlet box typically includes at least three openings in the bottom wall of the box, one for connection of a drain pipe and the other two for mounting two water shut off valves inside the box for the hot and cold water supply lines.

The drain pipe and water shut off valves may be installed in several different arrangements depending on the particular plumbing layout and the type of washing machine outlet box used. For example, different types of washing machine outlet boxes can accommodate a right hand drain arrangement, a left hand drain arrangement, or a center drain arrangement.

For inventory considerations, it is generally known to provide a single washing machine outlet box that can accommodate all three drain arrangements so the plumber doesn't have to keep an inventory of different washing machine outlet boxes to accommodate these different drain arrangements. However, there is a continuing need to provide a washing machine outlet box that can more easily be adapted to accommodate any drain arrangement desired (i.e., either a right hand or left hand drain arrangement or a center drain arrangement). Also there is a continuing need to be able to quickly and easily seal the drain opening of any of the drain arrangements with a test cap when the washing machine outlet box is first installed for pressure testing of the sanitary drainage system to which the drain opening is connected for leaks, and once the pressure testing is completed, just as quickly and easily remove the test cap without risk of any portions of the test cap falling into the drain opening.

SUMMARY OF THE INVENTION

The present invention is for a washing machine outlet box that may readily accommodate a right hand or left hand drain arrangement or a center drain arrangement if desired. The box includes a housing having a bottom wall containing multiple openings for accommodating valve mount inserts for the hot and cold water shut off valves and for connecting a drain pipe to the box.

In accordance with one aspect of the invention, two individual valve mount inserts may be inserted into at least one opening and the drain pipe may be connected to another opening in which the two valve mount inserts are not inserted for establishing a right hand, a left hand, or a center drain arrangement as desired.

In accordance with another aspect of the invention, the individual valve mount inserts may be secured in the respective openings in the bottom wall of the box as by a twist lock connection, a snap lock connection, a solvent weld or other suitable connection between the individual valve mount inserts and the bottom wall of the box.

In accordance with another aspect of the invention, two valve mount inserts may be joined together in spaced relation for insertion into at least one opening as a unit to provide valve mounts for hot and cold water shut off valves.

In accordance with another aspect of the invention, the spacing between the two joined valve mount inserts may correspond to the spacing between a center opening and either of two other openings on opposite sides of the center opening, whereby the two joined valve mount inserts may be inserted as a unit in the center opening and either one of the other two openings, and the drain pipe may be connected to the opening in which neither of the two joined valve mount inserts is inserted for establishing a right hand or a left hand drain arrangement as desired.

In accordance with another aspect of the invention, the two joined valve mount inserts may be secured within at least one of the openings in the bottom wall as by a snap lock connection or by a solvent weld or other suitable connection between the two joined valve mount inserts and the bottom wall of the box.

In accordance with another aspect of the invention, a test cap may be inserted into the drain opening in the bottom wall of the box and turned in a tightening direction to form a fluid tight seal around the drain opening during pressure testing and turned in an untightening direction for removal of the test cap upon completion of the pressure testing.

In accordance with another aspect of the invention, the top wall of the box may include one or more openings or knockouts to allow the box to be mounted upside down with the bottom wall at the top and the top wall at the bottom for top mounting of the water shut off valves inside the box and for connecting the drain pipe to the drain opening in the top wall which now becomes the bottom wall of the box.

These and other objects, advantages, features and aspects of the invention will become apparent as the following description proceeds.

To the accomplishment of the foregoing and related ends, the invention, then, comprises the features hereinafter more fully described and particularly pointed out in the claims, the following description and the annexed drawings setting forth in detail certain illustrative embodiments of the invention, these being indicative, however, of but several of the various ways in which the principles of the invention may be employed.

DETAILED DESCRIPTION OF THE INVENTION

Figure 1:
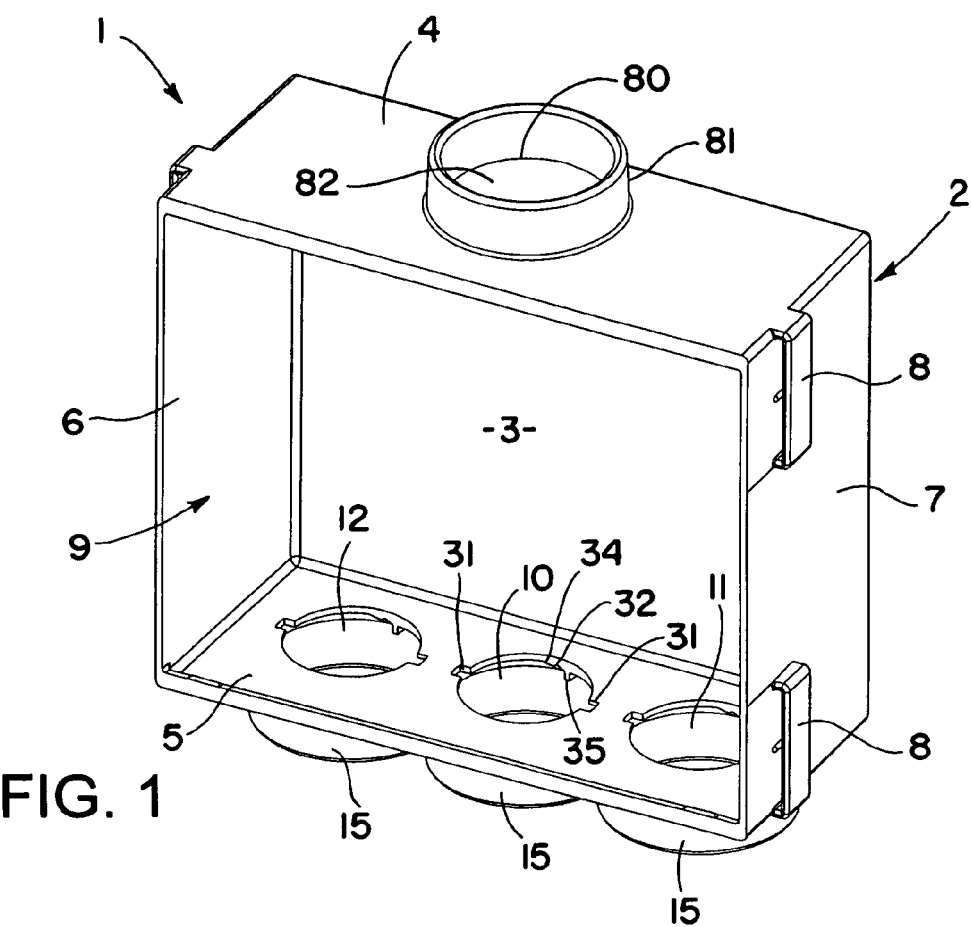
FIG. 1 is a front perspective view of one form of washing machine outlet box according to the present invention.

Referring now in detail to the drawings, and initially to FIG. 1, there is shown one form of washing machine outlet box 1 according to the present invention which may accommodate any one of a right hand drain arrangement, a left hand drain arrangement or a center drain arrangement as described hereafter. This has the advantage that a plumber only has to keep an inventory of this one washing machine outlet box to accommodate all three of these drain arrangements.

Box 1 may comprise a generally rectangular housing 2 having a back wall 3, top and bottom walls 4 and 5, and opposite side walls 6 and 7. Suitable loops 8 or the like may be provided on the outer surfaces of the side walls for receipt of mounting brackets or straps (not shown) used to recess mount the box into a wall as by attaching the brackets or straps to studs or other structural members of a building before the wall board or other sheet material is installed to finish the wall, which eliminates exposed piping and floor drain. Also an adjustable face plate (not shown) may be inserted into the open front 9 of the box to cover any gaps between the walls of the box and surrounding wall structure.

To accommodate any one of a right hand, left hand or center drain arrangement to meet whatever drain arrangement is desired or required for a particular installation, the bottom wall 5 of the box may include at least three openings, a center opening 10 and right and left hand openings 11 and 12 on opposite sides of the center opening. Extending downwardly from the bottom wall 5 around each of the openings 10-12 may be individual drain tail pieces 15 to facilitate attachment of a drain pipe to any one of the three openings as by solvent welding or otherwise attaching the drain pipe to the associated tail piece.

For supporting two water shut off valves for the hot and cold water supply lines inside the box, two individual valve mount inserts 16 may be inserted into any two of the openings in the bottom wall of the box and secured in place as described hereafter. Each valve mount insert 16 may generally be of the type shown in U.S. Pat. No. 6,155,286, the entire disclosure of which is incorporated herein by reference.

Figure 2:
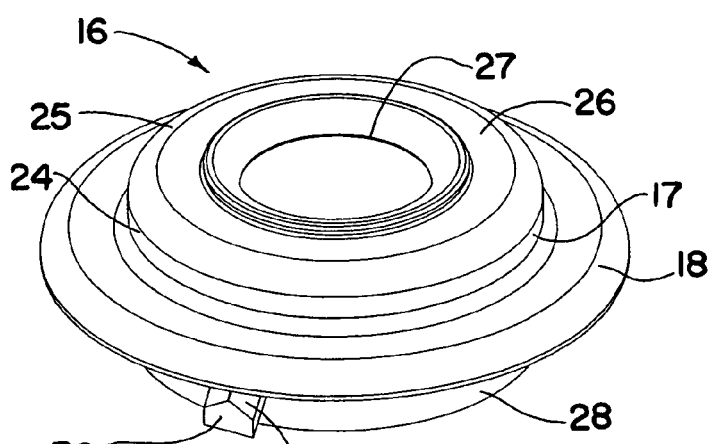
FIG. 2 is an enlarged perspective view of one form of valve mount insert according to the present invention for use with the washing machine outlet box of FIG. 1.
Figure 3:
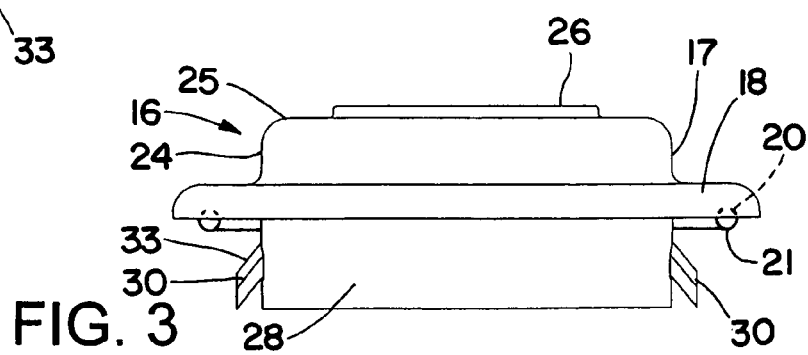
FIG. 3 is a side elevation view of the valve mount insert of FIG. 2.

One form of such valve mount insert 16 is shown in FIGS. 2 and 3 and includes a substantially cylindrical wall 17 having a flange 18 extending radially outwardly therefrom intermediate the ends thereof. Flange 18 may be sized and shaped to rest upon an annular seat 19 (see FIG. 4) surrounding each of the openings 10-12 in the box bottom wall 5. An annular groove 20 may be provided in the lower surface of flange 18 for receipt of an O-ring 21 that protrudes sufficiently below the bottom surface of the flange to form a fluid tight seal against the bottom wall around the openings in the bottom wall in which the valve mount inserts are inserted.

Figure 4:
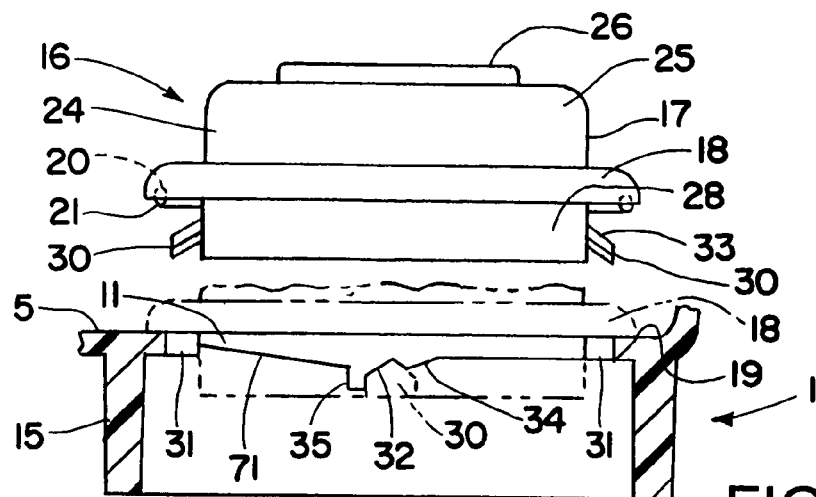
FIG. 4 is an enlarged fragmentary transverse section through one of the openings in the bottom wall of the washing machine outlet box of FIG. 1 in which a valve mount insert is shown positioned for insertion into the one opening.
Figure 5:
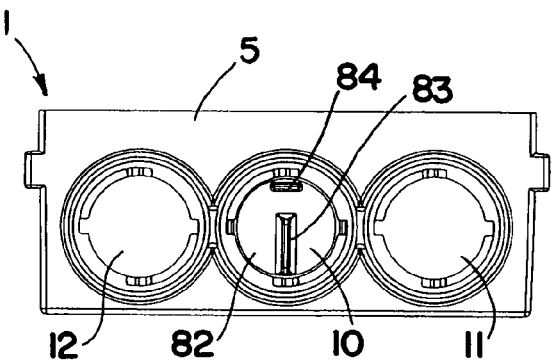
FIG. 5 is a reduced bottom plan view of the washing machine outlet box of FIG. 1.
Figure 6:
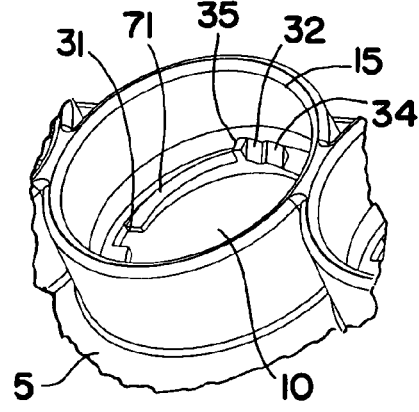
FIG. 6 is an enlarged fragmentary perspective view of a portion of the bottom side of the washing machine outlet box of FIG. 1 showing one of the openings in the bottom wall of the box and surrounding tail piece.

The upper portion 24 of the cylindrical wall 17 that extends above the flange 18 forms an elevated platform 25 including a top wall 26 with an opening 27 for mounting of a water shut off valve thereon. The lower portion 28 of the cylindrical wall 17 that extends below the flange 18 may have one or more locking tabs 30 protruding outwardly therefrom. Two such locking tabs 30 are shown in FIGS. 3 and 4 spaced 180° apart. The tabs are sized and oriented to pass through corresponding notches or slots 31 in the edge of each of the openings 10-12 in the box bottom wall and shaped to be captured within recesses 32 in the under side of the bottom wall in circumferential spaced relation from the notches (see FIGS. 4-6) when the valve mount inserts are turned in a locking direction within the respective openings to the locking position shown in phantom lines in FIG. 4. The recesses 32 may, for example, have a generally V-shape for engagement by a correspondingly V-shape top wall 33 of the locking tabs 30. A ramp 34 may be provided adjacent each recess 32 for providing an incline, for example of approximately 60°, into the recess.

A stop shoulder 35 may extend axially outwardly from the trailing end of each recess 32 to prevent the respective locking tabs 30 on each valve mount insert 16 from moving past the locking position. Also the sides of the ramp 34, recess 32 and stop shoulder 35 may slope downward at an angle for example of approximately 40° relative to the seat 19, and the locking tabs 30 may slope downward and outward from the cylindrical wall 17 of the valve mount inserts 16 at approximately the same angle (e.g., 40°) for sliding engagement with the surfaces.

Preferably the location and angle orientation of the notches 31 and locking recesses 32 for each of the openings 10-12 are the same, whereby the valve mount inserts 16 are always rotated in the same direction to the same extent (for example clockwise ¼ turn) to lock the valve mount inserts in any of the selected openings. This has the advantage that if desired, the associated water shut off valves can be factory mounted on the valve mount inserts 16 in the required orientation (e.g., with the hose bibb outlet oriented in line with the mounting tabs 30) to eliminate the need for having to mount the valves on the valve mount inserts in the field.

Figure 7:
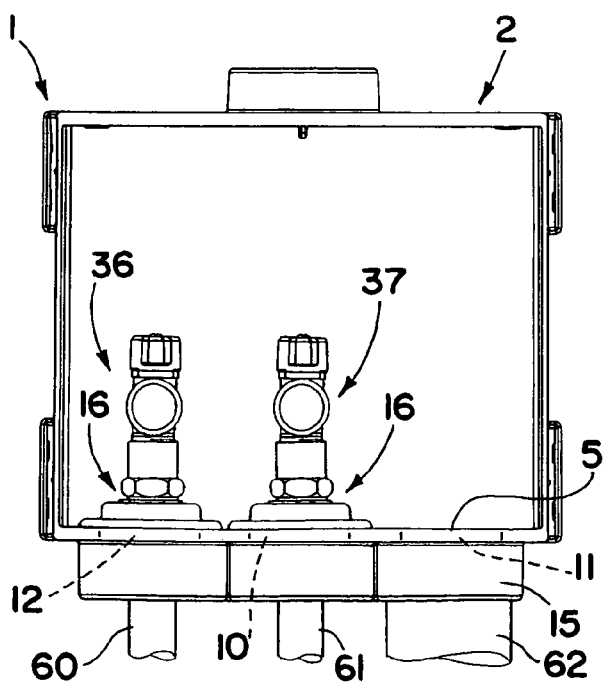
FIG. 7 is a front elevation view of the washing machine outlet box of FIG. 1 showing two valve mount inserts (with hot and cold water shut off valves mounted thereon) inserted into the center opening and left hand opening of the box for establishing a right hand drain arrangement.
Figure 8:
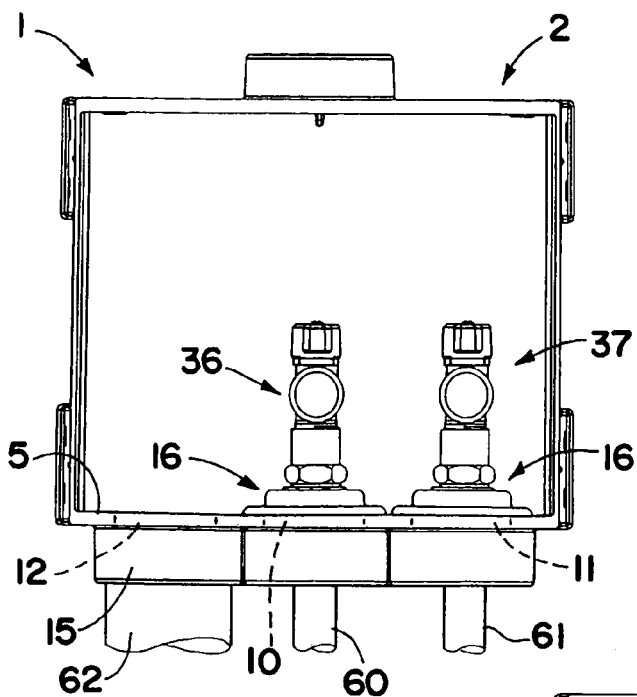
FIG. 8 is a front elevation view similar to FIG. 7 but showing the two valve mount inserts inserted into the center opening and the right hand opening in the bottom wall of the box for establishing a left hand drain arrangement.
Figure 9:
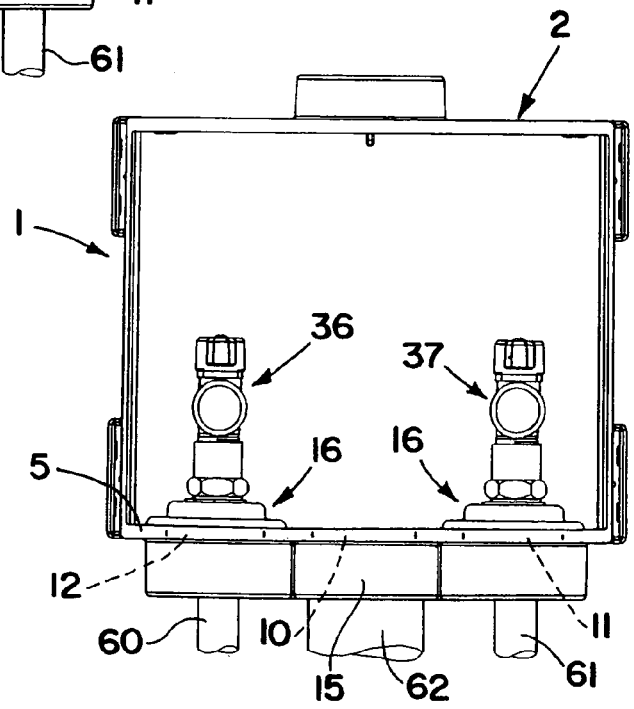
FIG. 9 is a front elevation view similar to FIG. 7 but showing the two valve mount inserts inserted into the left and right hand openings in the bottom wall of the box for establishing a center drain arrangement.

To assemble the washing machine outlet box 1 for a right hand drain arrangement, two individual valve mount inserts 16 are inserted and secured in place in the center opening 10 and left hand opening 12 in the bottom wall of the box (with the hot and cold water shut off valves 36 and 37 mounted thereon) as schematically shown in FIG. 7. For a left hand drain arrangement, the two valve mount inserts 16 are inserted and secured in place in the center opening 10 and right hand opening 11 as schematically shown in FIG. 8, and for a center drain arrangement, the two valve mount inserts 16 are inserted and secured in place in the right and left hand openings 11 and 12 as schematically shown in FIG. 9.

While the locking tabs are shown on the valve mount inserts and the recesses for the locking tabs are shown in the bottom wall of the box, it will be appreciated that the locking tabs may be provided on the box bottom wall and the recesses may be provided in the valve mount inserts if desired.

Figure 10:
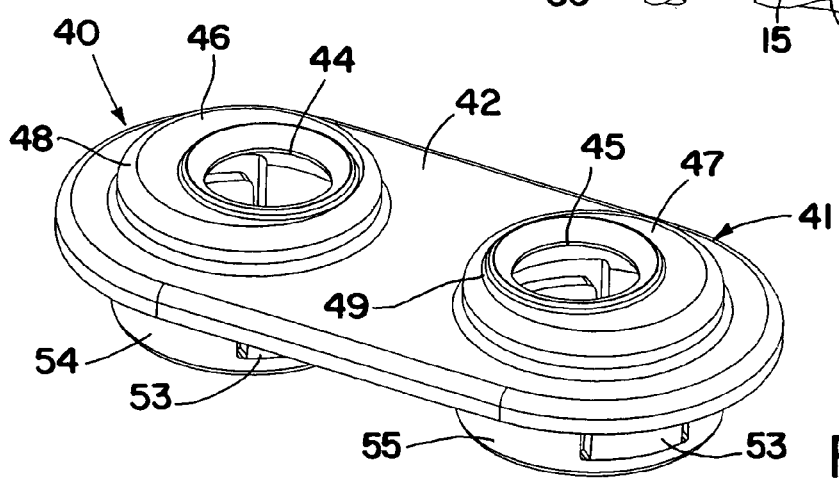
FIG. 10 is an enlarged perspective view of two valve mount inserts joined together as a single unit.
Figure 11:
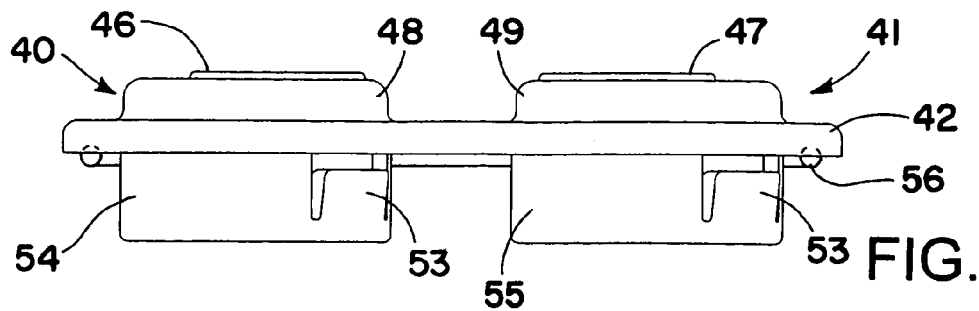
FIG. 11 is a front elevation view of the two joined valve mount inserts of FIG. 10.

Moreover, instead of having individual valve mount inserts 16, two valve mount inserts 40 and 41 may be joined together in spaced relation from one another by a mounting plate or flange 42 that may be integrally formed with the two valve mount inserts as schematically shown in FIGS. 10 and 11. The spacing between the two joined valve mount inserts 40 and 41 may be the same as the spacing between the center opening 10 and each of the other two openings 11, 12 in the bottom wall of the box so that when the two joined valve mount inserts are inserted into the center opening 10 and either of the other two openings 11, 12, the two joined valve mount inserts will be properly seated in such openings. This has the advantage that a single lever operated hot and cold water shut off valve assembly 43 (shown in FIGS. 13 and 14) may be mounted on the two joined valve mount inserts. The openings 44 and 45 in the top walls 46 and 47 of the elevated platforms 48 and 49 of the two joined valve mount inserts 40 and 41 may have to be slightly offset toward one another as schematically shown in FIGS. 10 and 11 to correspond to the distance between the two shut off valves 50 and 51 of the single lever valve assembly 43. Of course, it should be understood that individually operated water shut off valves 36 and 37 (shown in FIGS. 7-9) may also be mounted on the two joined valve mount inserts 40 and 41 if desired.

Figure 12:
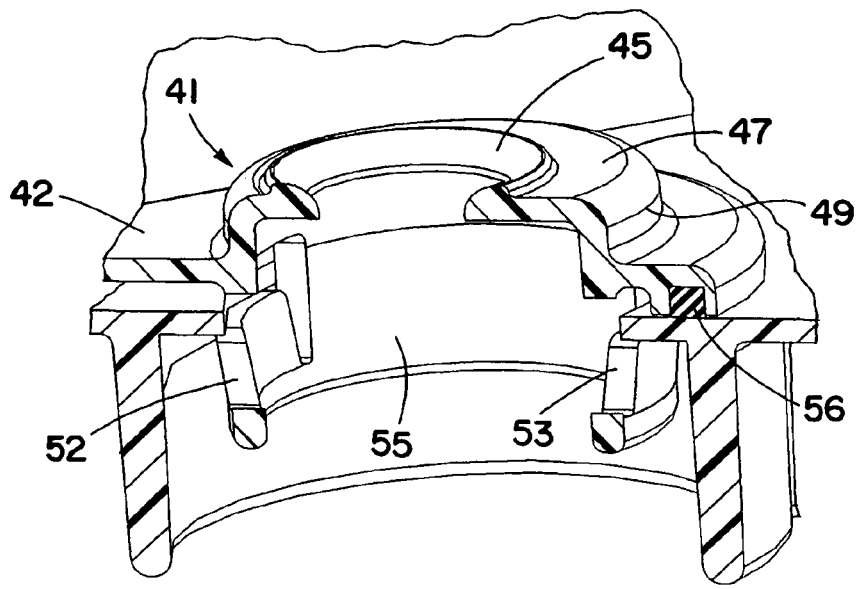
FIG. 12 is an enlarged fragmentary perspective view of a portion of the box of FIG. 1 partly in section through one of the openings in the bottom wall and a portion of one of the two joined valve mount inserts of FIGS. 10 and 11 inserted into the opening.

Another advantage in joining the two valve mount inserts 40 and 41 together as shown in FIGS. 10 and 11 is that a simple snap lock connection may be used to secure the two joined valve mount inserts in the center opening and either of the other two openings in the bottom wall of the box. For example, two circumferentially spaced outwardly biased snap tabs 52 and 53 may be provided on the lower cylindrical portions 54 and 55 of each of the two joined valve mount inserts 40 and 41 that extend downwardly below the mounting plate or flange 42. The snap tabs 52 and 53 may be oriented so they are circumferentially offset from the notches 31, ramps 34, recesses 32 and stop shoulders 35 on the bottom side of the bottom wall 5 of the box 1 surrounding each of the openings 10-12 therein. Accordingly, when the lower cylindrical portions 54 and 55 of the two joined valve mount inserts 40 and 41 are lined up with the selected openings 10-12 in the bottom wall of the box, and the two joined valve mount inserts are pressed downwardly as a unit, the mounting plate or flange 42 will move into seated engagement with the upper surface of the box bottom wall 5 and the snap tabs 52 and 53 will move below the bottom wall and snap outwardly, locking the inserts 40 and 41 in place as schematically shown in FIG. 12. When thus seated, the mounting plate or flange 42 extends radially outwardly beyond the center opening 10 and the other opening 11 or 12 in which the two joined valve mounts 40 and 41 are inserted. An O-ring seal 56 may be provided on the under side of the mounting plate or flange 42 radially outwardly of the openings 10-12 and notches 31 in the bottom wall of the box to establish a fluid seal between the flange or plate and the bottom wall completely surrounding the two openings.

If desired, a solvent weld or other type of adhesive connection may be made between the individual valve mount inserts 16 or two joined valve mount inserts 40 and 41 and the housing bottom wall in lieu of or in addition to the twist lock connection shown in FIG. 4 or the snap lock connection shown in FIG. 12. Also a suitable snap lock connection of the type shown, for example, in FIG. 12 may be used to secure the individual valve mount inserts 16 in the respective openings in the bottom wall of the box. In that event, suitable means such as non-circular openings in the box bottom wall and correspondingly shaped lower portions 28 of the valve mount inserts 16 may be provided to prevent the valve mount inserts from turning within the openings.

Figure 13:
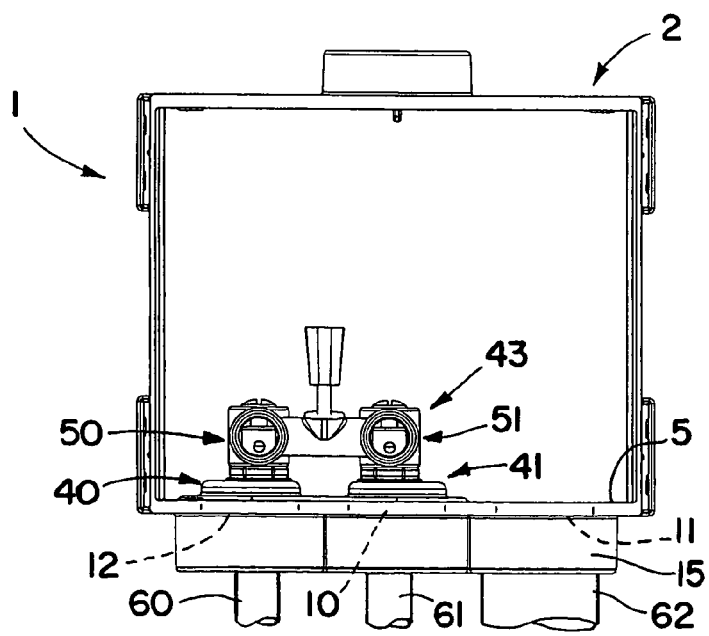
FIG. 13 is a front elevation view of the washing machine outlet box of FIG. 1 showing the two joined valve mount inserts of FIGS. 10 and 11 (with a single lever operated hot and cold water shut off valve assembly mounted thereon) inserted in the center opening and the left hand opening in the bottom wall of the box for establishing a right hand drain arrangement.
Figure 14:
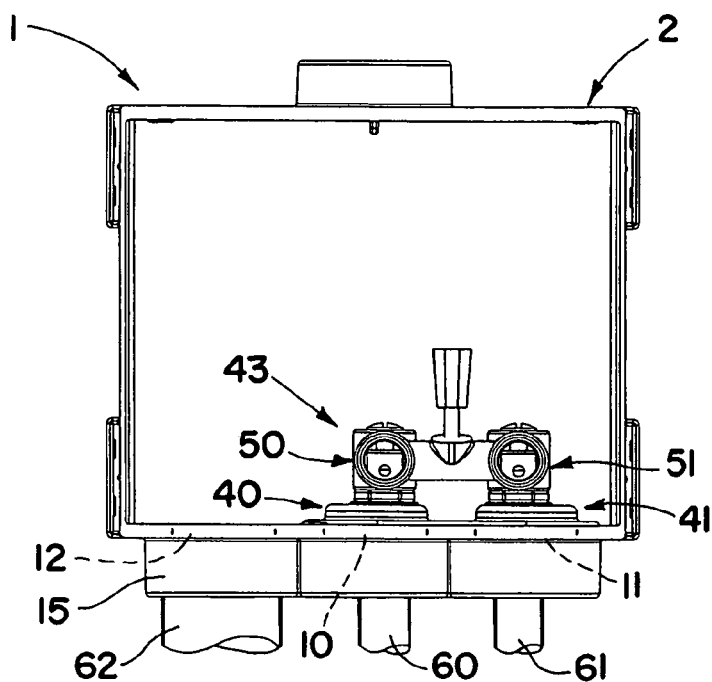
FIG. 14 is a front elevation view similar to FIG. 13 but showing the two joined valve mount inserts of FIGS. 10 and 11 inserted in the center opening and the right hand opening in the bottom wall of the box for establishing a left hand drain arrangement.

When the two joined valve mount inserts 40 and 41 are utilized with a box of the type shown in FIG. 1, one of the valve mount inserts 40 and 41 must always be aligned with the center opening 10 in the bottom wall of the box as shown in FIGS. 13 and 14. Thus a center drain arrangement is not possible with this assembly. However, either a right hand or left hand drain arrangement is possible with this assembly by aligning the other valve mount insert with the left or right hand opening 12 or 11 in the bottom wall of the box as shown in FIGS. 13 and 14, respectively. Alternatively, if desired, the openings in the bottom wall of the box may be made large enough to accommodate both of the two joined valve mount inserts.

After the valve mount inserts and hot and cold water shut off valves are properly installed in the box to meet the job requirements and the box is properly mounted between the studs or other structural wall members, before the wall board or other sheet material is installed to finish the wall, the hot and cold water supply lines 60 and 61 are attached to the respective hot and cold water shut off valves 36 and 37 of FIGS. 7-9 and 50 and 51 of FIGS. 13 and 14 and the drain pipe 62 is solvent welded or otherwise attached to the tail piece 15 surrounding the drain opening.

A test cap of any suitable type may be used to temporarily seal off the drain opening to permit pressure testing of the sanitary drainage system to which the drain pipe is connected for leaks. However, utilizing a test cap according to the present invention has an advantage over other known test caps in that it may be more quickly and easily installed than other known test caps. Also the test cap of the present invention may be just as quickly and easily removed from the drain opening without having to destroy the test cap, thus eliminating the risk of any portion of the test cap falling into the drain opening and possibly blocking flow therethrough and permitting the test cap to be reused.

Figure 15:
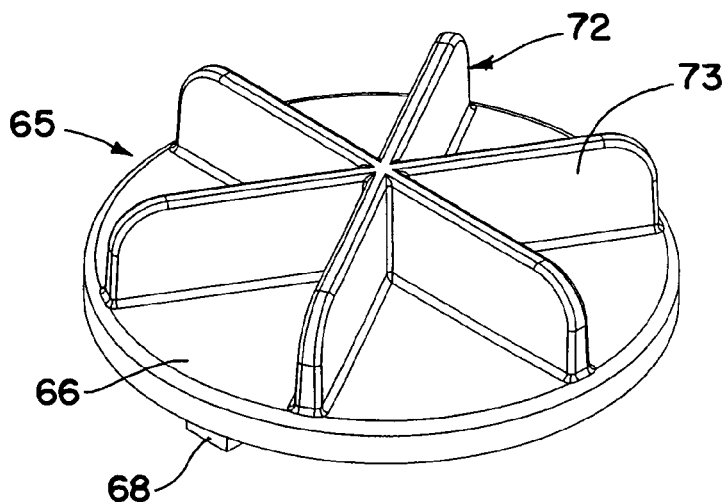
FIG. 15 is an enlarged perspective view of one form of test cap according to the present invention.
Figure 16:
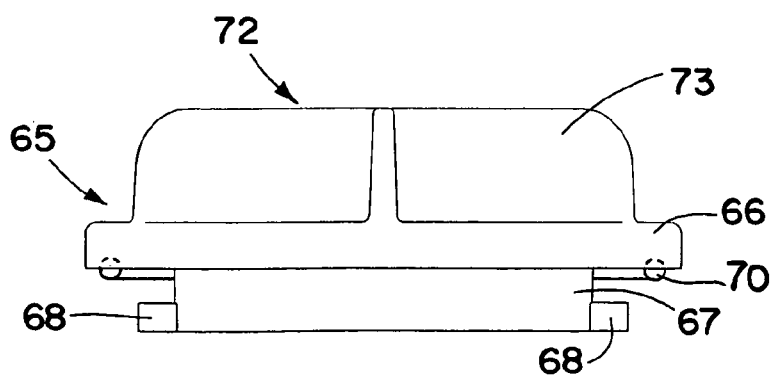
FIG. 16 is a side elevation view of the test cap of FIG. 15.
Figure 17:
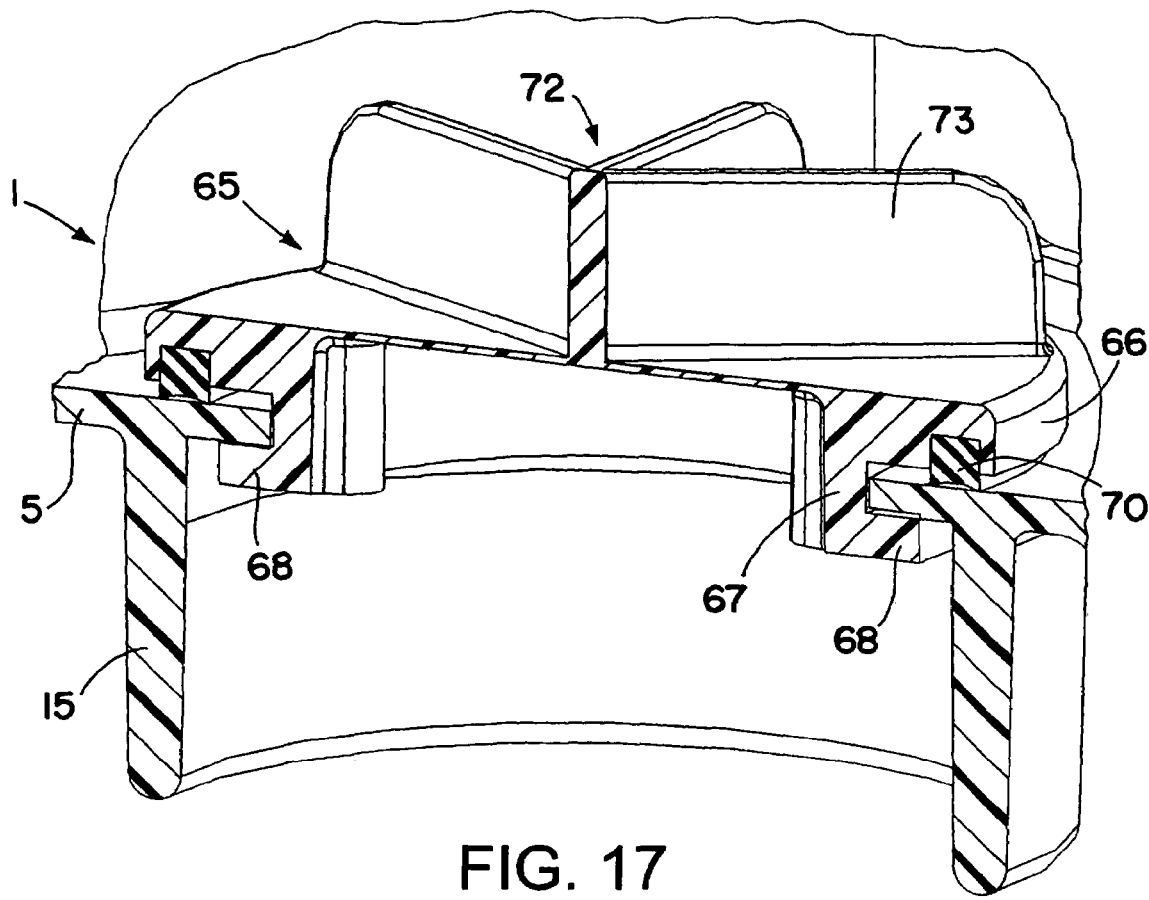
FIG. 17 is an enlarged fragmentary perspective view of a portion of the washing machine outlet box of FIG. 1, partly in section through one of the openings in the bottom wall and a portion of the test cap of FIGS. 15 and 16 mounted in the opening.
Figure 18:
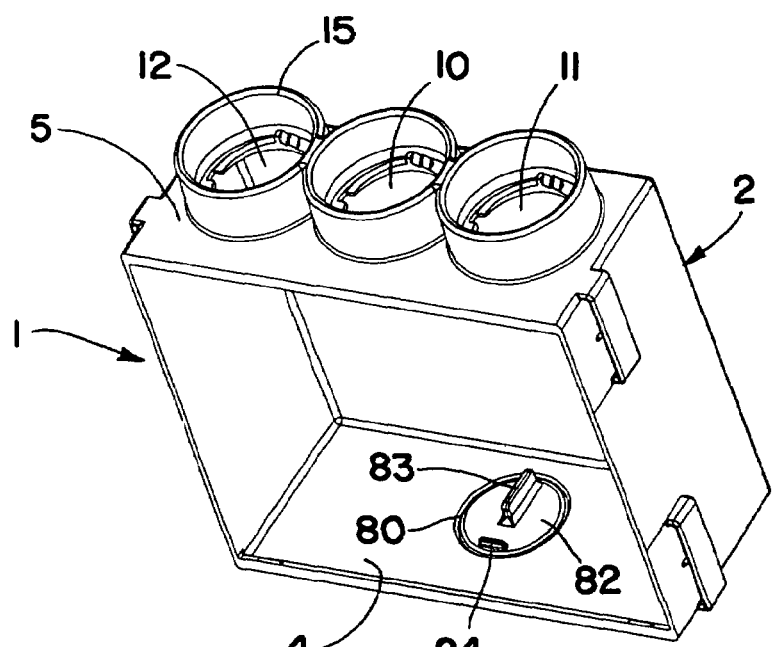
FIG. 18 is a perspective view of the washing machine outlet box of FIG. 1 turned upside down.

One form of test cap 65 according to the present invention is shown in FIGS. 15-17 and includes a flange portion 66 and a cylindrical portion 67 extending downwardly from the bottom side of the flange portion that is sized to closely fit within any of the openings in the bottom wall of the box. Protruding radially outwardly from the cylindrical portion 67 are two or more tabs 68 (two being shown) that are sized and oriented to pass through notches 31 in the edge of the drain opening when the tabs are aligned with the notches and the test cap is pushed downwardly. These notches 31 may be the same notches through which the locking tabs 30 on the valve mount inserts 16 are insertable or different notches as desired. To insure that a fluid tight seal is formed between the test cap 65 and the bottom wall of the box surrounding the drain opening, an O-ring seal 70 may be provided on the bottom side of the test cap flange 66 radially outwardly of the drain opening notches 31. Also, a second ramp 71 (see FIGS. 4 and 6) may be provided on the bottom side of the bottom wall leading away from the side of each notch 31 in the opposite direction from which the valve mount inserts are rotated during tightening of the valve mount inserts (i.e., in the counterclockwise direction as viewed in FIG. 17) that is engageable by the tabs 68 on the test cap 65 during turning of the test cap in the tightening direction to cause the seal on the test cap to press into sealing engagement with the bottom wall. The test cap tabs 68 may be spaced from the bottom side of the test cap flange 66 a distance slightly less than the thickness of the bottom wall 5 of the box. Thus when the tabs 68 are properly lined up with the notches 31 in the edge of the drain opening and the test cap is pushed downwardly into seated engagement with the bottom wall surrounding the drain opening, the test cap may only be turned in the tightening direction to cause the tabs to move along the second ramp 71 which may have an initial thickness somewhat less than the thickness of the bottom wall and which progressively increases to a thickness somewhat greater than the bottom wall as schematically shown in FIG. 4.

A handle 72 may be provided on the upper side of the test cap flange 73 which may include a plurality of spoke-like finger engaging portions 73 for ease of turning the test cap in either direction. Once pressure testing of the sanitary drainage system to which the drain pipe 62 is connected is completed, the test cap 65 may be turned in the opposite direction to bring the tabs 68 once again into alignment with the notches 31 in the edge of the drain opening, thus allowing the test cap to be removed for possible reuse. More importantly, the test cap does not have to be destroyed during the removal process, which can oftentimes be difficult and time consuming to do, and can result in portions of the test cap dropping into the drain opening, causing potential clogging problems.

Instead of providing the locking tabs on the test cap and the recesses for the locking tabs in the bottom wall, the locking tabs may be provided on the bottom wall and the recesses for the locking tabs may be provided in the test cap. Alternatively, a threaded connection may be provided between the test cap and bottom wall of the box if desired.

In the usual case, the water supply lines 60 and 61 enter the box 1 from below. However, some installations may call for the water lines to enter the box from above. To permit the box 1 of the present invention to be used for this type of installation, the top wall 4 of the box may be provided with one or more openings 80, thus allowing the box to be mounted upside down for top mounting of the water shut off valves 36, 37 or 50, 51 in two of the openings in the bottom wall 5 of the box in the manner previously described (which then becomes the top wall) and for connecting the drain pipe 62 to the opening 80 in the top wall 4 (which then becomes the bottom wall). A tail piece 81 may surround the opening 80 in the top wall 4 to facilitate attachment of the drain pipe 62 thereto if desired. Also a frangible knockout 82 may be provided for closing the opening 80 in the top wall 4. The knockout 82 would typically only be removed if the box were installed upside down and a drain pipe were connected to the drain opening, and then only after pressure testing of the sanitary system for leaks has been completed. A pull handle 83 may be provided on the inside surface of the knockout 82. Also a screwdriver stop 84 may be provided on the inside surface of the knockout so the tip of a screwdriver may be placed against the stop through the open front of the box and the handle of the screwdriver tapped by a hammer to break the knockout out of the top wall 4.

Although the invention has been shown and described with respect to certain embodiments, it is obvious that equivalent alterations and modifications will occur to others skilled in the art upon the reading and understanding of the specification. In particular, with regard to the various functions performed by the above described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function in the herein exemplary embodiments of the invention. In addition, while a particular feature of the invention may have been disclosed with respect to only one embodiment, such features may be combined with one or more other features as may be desired and advantageous to any given or particular application.

What is claimed is:

1. A washing machine outlet box comprising a housing having a bottom wall containing multiple openings, two valve mount inserts selectively insertable into at least one of the openings to provide valve mounts for hot and cold water shut off valves, and a test cap that is insertable into an other of the openings, the test cap including means for sealing off the other opening during turning of the test cap in a tightening direction after inserting the test cap into the other opening, and being turnable in an untightening direction for removal of the test cap from the other opening, at least one locking tab on one of the bottom wall and the valve mount inserts and a notch in the other of the bottom wall and the valve mount inserts through which the locking tab is insertable for engagement with the other of the bottom wall and the valve mount inserts upon turning the valve mount inserts in a locking direction, wherein one of the test cap and the bottom wall has at least one tab that is insertable through a notch in the other of the test cap and the bottom wall for engagement with the other of the test cap and the bottom wall upon turning the test cap in the tightening direction, and a recess in the other of the test cap and the bottom wall in circumferential spaced relation from each notch for capturing the locking tab during turning of each of the valve mount inserts in the locking direction, a first ramp leading into each recess when each of the valve mount inserts is turned in the locking direction, and a second ramp leading in the opposite direction from the notch that is engageable by the tab during turning of the test cap in the tightening direction to cause a seal on the test cap to press into sealing engagement with the bottom wall radially outwardly of the notch.

2. The box of claim 1 wherein the two valve mount inserts are each insertable in any two of at least three openings, and a drain pipe is connectable to the third opening in which the two valve mount inserts are not inserted.

3. The box of claim 2 wherein tail pieces surround each of the three openings in the bottom wall of the box.

4. The box of claim 2 wherein one of the openings is located between the other two openings whereby the one opening is a center opening and the other two openings are right and left hand openings, respectively, the two valve mount inserts are insertable into any two of the openings, and a drain pipe is connectable to the third opening for establishing any one of a center drain arrangement, a right hand drain arrangement or a left hand drain arrangement.

5. A washing machine outlet box comprising a housing having a bottom wall containing multiple openings, two valve mount inserts selectively insertable into at least one of the openings to provide valve mounts for hot and cold water shut off valves, and a test cap that is insertable into an other of the openings, the test cap including means for sealing off the other opening during turning of the test cap in a tightening direction after inserting the test cap into the other opening, and being turnable in an untightening direction for removal of the test cap from the other opening, wherein one of the openings is located equidistant between two other openings whereby the one opening is a center opening and the two other openings are right and left hand openings, respectively, and the two valve mount inserts are joined together in spaced relation a distance corresponding to the spacing between the center opening and the other two openings, whereby the two joined valve mount inserts are insertable in the center opening and either one of the two other openings as a unit, and a drain pipe is connectable to the other of the two other openings in which neither of the joined valve mount inserts is inserted for establishing either a right hand drain arrangement or a left hand drain arrangement.

6. The box of claim 5 wherein one of the test cap and the bottom wall has at least one tab that is insertable through a notch in the other of the test cap and the bottom wall for engagement with the other of the test cap and the bottom wall upon turning the test cap in the tightening direction to secure the test cap in place.

7. The box of claim 6 wherein the other of the test cap and the bottom wall has a ramp that is engageable by the tab during turning of the test cap in the tightening direction to force the test cap into sealing engagement with the bottom wall radially outwardly of the notch.

8. The box of claim 7 further comprising means for forming a fluid seal between the test cap and the bottom wall radially outwardly of the notch during turning of the test cap in the tightening direction.

9. The box of claim 5 further comprising a handle on the test cap to facilitate turning of the test cap in the tightening and untightening directions.

10. The box of claim 9 wherein the handle includes spoke-like finger engaging portions for ease of turning the test cap in the tightening and untightening directions.

11. The box of claim 5 wherein a single lever operated hot and cold water shut off valve assembly is mounted on the two joined valve mount inserts.

12. The box of claim 5 wherein individually operated hot and cold water shut off valves are mounted on the two joined valve mount inserts.

13. The box of claim 5 wherein the two joined valve mount inserts are connected together by a flange that overlies the center opening and the one of the two other openings in which the two joined valve mount inserts are inserted as a unit.

14. The box of claim 13 further comprising means for establishing a fluid seal between the flange and the bottom wall of the box completely surrounding the center opening and the one of the two other openings in which the two joined valve mount inserts are inserted.

15. The box of claim 5 wherein a drain pipe is connectable to the other of the two other openings in which neither of the two joined valve mount inserts is inserted.

16. The box of claim 5 further comprising a snap lock connection between the two joined valve mount inserts and an edge of the openings in which the two joined valve mount inserts are inserted.

17. The box of claim 5 further comprising a solvent weld or adhesive connection between the flange of the two joined valve mount inserts and the bottom wall of the box.

18. The box of claim 5 further comprising at least one tail piece on the bottom wall of the box surrounding the opening in which neither of the two joined valve mount inserts is inserted for connecting a drain pipe thereto.

19. The box of claim 5 wherein a single lever operated hot and cold water shut off valve assembly is mounted on the two joined valve mount inserts.

20. The box of claim 5 wherein individually operated hot and cold water shut off valves are mounted on the two joined valve mount inserts.

21. The box of claim 5 wherein the two joined valve mount inserts are connected together by a flange that overlies the center opening and the one of the two other openings in which the two valve mount inserts are inserted.

22. The box of claim 21 further comprising means for establishing a fluid seal between the flange and the bottom wall of the box completely surrounding the center opening and the one of the two other openings in which the two joined valve mount inserts are inserted.

23. The box of claim 21 further comprising a solvent weld or adhesive connection between the flange of the two joined valve mount inserts and the bottom wall of the box.

24. A washing machine outlet box comprising a housing having a bottom wall containing multiple openings, two valve mount inserts selectively insertable into at least one of the openings to provide valve mounts for hot and cold water shut off valves, and a test cap that is insertable into an other of the openings, the test cap including means for sealing off the other opening during turning of the test cap in a tightening direction after inserting the test cap into the other opening, and being turnable in an untightening direction for removal of the test cap from the other opening, wherein the housing has a top wall containing at least one opening to allow the box to be mounted upside down with the bottom wall at the top and the top wall at the bottom for top mounting of the two valve mount inserts inside the box and for connecting a drain pipe to the opening in the top wall instead of to the other opening in the bottom wall in which neither of the two valve mount inserts is inserted.

25. The box of claim 24 further comprising at least one locking tab on one of the bottom wall and the valve mount inserts and a notch in the other of the bottom wall and the valve mount inserts through which the locking tab is insertable for engagement with the other of the bottom wall and the valve mount inserts upon turning the valve mount inserts in a locking direction.

26. The box of claim 25 further comprising a recess in the other of the bottom wall and the valve mount inserts in circumferential spaced relation from each notch for capturing the locking tab during turning of the valve mount inserts in the locking direction, and a ramp leading into each recess when each of the valve mount inserts is turned in the locking direction.

27. The box of claim 25 wherein one of the test cap and the bottom wall has at least one tab that is insertable through a notch in the other of the test cap and the bottom wall for engagement with the other of the test cap and the bottom wall upon turning the test cap in the tightening direction.

28. The box of claim 24 further comprising a removable knockout covering the opening in the top wall.

29. The box of claim 24 further comprising a tail piece surrounding the opening in the top wall.

30. A washing machine outlet box comprising a housing having a bottom wall containing at least three openings, one of the openings being located equidistant between the two other openings whereby the one opening is a center opening and the two other openings are right and left hand openings, respectively, two valve mount inserts joined together in spaced relation, the spacing between the two joined valve mount inserts being such that the two joined valve mount inserts are insertable into the center opening and either one of the two other openings as a unit to provide valve mounts for hot and cold water shut off valves, wherein the housing has a top wall containing at least one opening to allow the box to be mounted upside down with the bottom wall at the top and the top wall at the bottom for top mounting of the two joined valve mount inserts inside the box and for connecting a drain pipe to the opening in the top wall instead of to the opening in the bottom wall in which neither of the two joined valve mount inserts is inserted.

31. The box of claim 30 further comprising a removable knockout covering the opening in the top wall.

32. The box of claim 30 further comprising a tail piece surrounding the opening in the top wall.

* * * * *